United States Patent
Ahn

(10) Patent No.: US 7,972,567 B2
(45) Date of Patent: Jul. 5, 2011

(54) APPARATUS FOR MANUFACTURING ULTRA-FINE PARTICLES USING CORONA DISCHARGE AND METHOD THEREOF

(76) Inventor: Kang-Ho Ahn, Seoul (KR)

( * ) Notice: Subject to any disclaimer, the term of this patent is extended or adjusted under 35 U.S.C. 154(b) by 1283 days.

(21) Appl. No.: 10/598,354

(22) PCT Filed: Feb. 25, 2005

(86) PCT No.: PCT/KR2005/000530
§ 371 (c)(1),
(2), (4) Date: Aug. 24, 2006

(87) PCT Pub. No.: WO2005/082539
PCT Pub. Date: Sep. 9, 2005

(65) Prior Publication Data
US 2007/0256922 A1    Nov. 8, 2007

(30) Foreign Application Priority Data
Feb. 27, 2004  (KR) .................................. 2004-13535

(51) Int. Cl.
*B01J 19/08* (2006.01)
*B05B 5/025* (2006.01)
(52) U.S. Cl. .................................. 422/186.04; 118/627
(58) Field of Classification Search ............. 422/186.04; 239/704, 708; 118/627
See application file for complete search history.

(56) References Cited

U.S. PATENT DOCUMENTS

| | | | |
|---|---|---|---|
| 5,015,845 A | 5/1991 | Allen et al. | |
| 5,247,842 A | 9/1993 | Kaufman et al. | |
| 5,523,566 A | 6/1996 | Fuerstenau et al. | |
| 5,873,523 A | 2/1999 | Gomez et al. | |
| 6,479,077 B1 * | 11/2002 | Borra | 424/489 |
| 6,860,434 B2 * | 3/2005 | Ahn et al. | 239/102.1 |

FOREIGN PATENT DOCUMENTS

| | | |
|---|---|---|
| JP | 9285739 A | 11/1997 |
| JP | 1666063 A | 3/2004 |
| KR | 7901998 B1 | 12/1979 |
| KR | 200133367 U | 1/1999 |
| WO | 9910103 A1 | 3/1999 |

* cited by examiner

*Primary Examiner* — Kishor Mayekar
(74) *Attorney, Agent, or Firm* — Lowe Hauptman Ham & Berner LLP

(57) ABSTRACT

The present invention discloses an apparatus and method for manufacturing ultra-fine particles using corona discharge capable of manufacturing the ultra-fine particles nanometers in size from a reaction gas using the corona discharge. In the apparatus for manufacturing ultra-fine particles of the present invention, a reaction gas feeder supplies a nozzle with reaction gas, and the reaction gas is injected. When a power supply applies a high voltage to the nozzle, the corona discharge occurs at the nozzle. Thus, the injected reaction gas is dissolved, and a large number of ultra-fine particles are produced. Then, a collection plate collects the ultra-fine particles. In addition, a duct encloses the nozzle, so that a passage is formed between the nozzle and duct. Sheath gas supplied to the passage of the duct forms a gas curtain between the nozzle and the collection plate, so that the gas curtain leads the flow of the ultra-fine particles. If other reaction gas is supplied to the passage of the duct and heat energy is supplied thereto, the other reaction gas reacts thermochemically, so that a large number of other ultra-fine particles are produced. The ultra-fine particles produced by the corona discharge are coated with the other ultra-fine particles. If the corona discharge is generated while the ultra-fine particles and the other reaction gas are injected by another nozzle positioned downstream of the nozzle, the ultrafine particles are coated with the other ultra-fine particles produced from the other reaction gas.

18 Claims, 13 Drawing Sheets

APPARATUS FOR MANUFACTURING ULTRA-FINE PARTICLES USING CORONA DISCHARGE AND METHOD THEREOF

RELATED APPLICATIONS

The present application is a National Phase entry of International Application Number PCT/KR2005/000530, filed Feb. 25, 2005, which claims priority from, Korean Application Number 10-2004-0013535, filed Feb. 27, 2004, the disclosure of which is hereby incorporated by reference herein in its entirety.

TECHNICAL FIELD

The present invention relates to an apparatus and method for manufacturing ultra-fine particles using corona discharge, wherein ultra-fine particles nanometers in size can be manufactured from reaction gas by corona discharge.

BACKGROUND ART

Generally, ultra-fine particles nanometers in size have been manufactured using flames or a furnace and obtained by collecting them with a filter or causing them to be attached to a collection plate. Since the ultra-fine particles are manufactured at high temperature in the prior art, there are disadvantage in that a great deal of energy is necessary and the collection rate is low. Additionally, ultra-fine particles of metal oxides such as $SiO_2$ or $Fe_2O_3$ that fail to be collected cause environmental pollution. There is also a disadvantage in that the ultra-fine particles adhere and cohere to each other at high temperature so that properties thereof are lost.

In the meantime, corona discharge used in the manufacture of the ultra-fine particles, which is a type of discharge in gas, is a phenomenon that occurs when a high voltage is applied between two electrodes, before flames are generated, only a portion with a strong electric field emits light and has conductivity. When both the electrodes are in the form of a plate, a globe with large diameter, or the like, the electric field is nearly uniform. However, if one or two electrodes are a needle type or a cylinder type, the electric field around the electrodes is especially strong, so that partial discharge occurs. The electrons discharged by corona discharge collide against air molecules adjacent thereto, so that numbers of ions with a positive charge are generated. The gas in which electrons and ions with a positive charge are separated from each other is referred to as plasma.

Plasma technology to which the corona discharge pertains is widely used in dry etching, chemical vapor deposition, plasma polymerization, surface modification, sputtering, air purification, and the like, which are disclosed in U.S. Pat. Nos. 5,015,845, 5,247,842, 5,523,566, and 5,873,523.

However, in the conventional plasma technology using electrodes of a needle or cylinder type, there is a problem in that the installation of the electrodes causes the relevant apparatus to be complicated. Particularly, there is a problem in that electrodes of a needle type are easily broken due to deterioration when used for a long time and in that the replacement of the broken electrode causes workability and operationability to deteriorate.

DISCLOSURE

Technical Problem

Accordingly, the present invention is conceived to solve the aforementioned problems in the prior art. An object of the present invention is to provide an apparatus and method for manufacturing ultra-fine particles using corona discharge capable of manufacturing uniform ultra-fine particles nanometers in size from reaction gas by corona discharge.

Another object of the present invention is to provide an apparatus and method for manufacturing ultra-fine particles using corona discharge capable of considerably increasing the collection rate of the ultra-fine particles.

A further object of the present invention is to provide an apparatus and method for manufacturing ultra-fine particles using corona discharge capable of sticking heterogeneous ultra-fine particles to each other or effectively coating ultra-fines particle with other ultra-fine particles.

Technical Solution

According to an aspect of the present invention for achieving the objects, there is provided an apparatus for manufacturing ultra-fine particles using corona discharge, comprising: a reaction gas supplying means for supplying reaction gas; at least one nozzle connected to the reaction gas supplying means to cause the reaction gas to be injected therefrom and produce a large number of ultra-fine particles by corona discharge of the injected reaction gas; a power supplying means connected to the nozzle to apply a voltage causing the corona discharge thereto; and a collecting means spaced from the nozzle to collect the ultra-fine particles produced by the corona discharge of the nozzle.

According to another aspect of the present invention, there is provided a method for manufacturing ultra-fine particles using corona discharge, comprising steps of: generating corona discharge by allowing a power supplying means to apply a high voltage to a nozzle; supplying reaction gas to the nozzle by a reaction gas supplying means; producing a large number of ultra-fine particles by injecting the reaction gas into a corona discharge region of the nozzle; and collecting the ultra-fine particles passing through the corona discharge region of the nozzle by a collecting means.

BEST MODE

Hereinafter, preferred embodiments of an apparatus and method for manufacturing ultra-fine particles using corona discharge according to the present invention will be described in detail with reference to the accompanying drawings.

Figure 1:
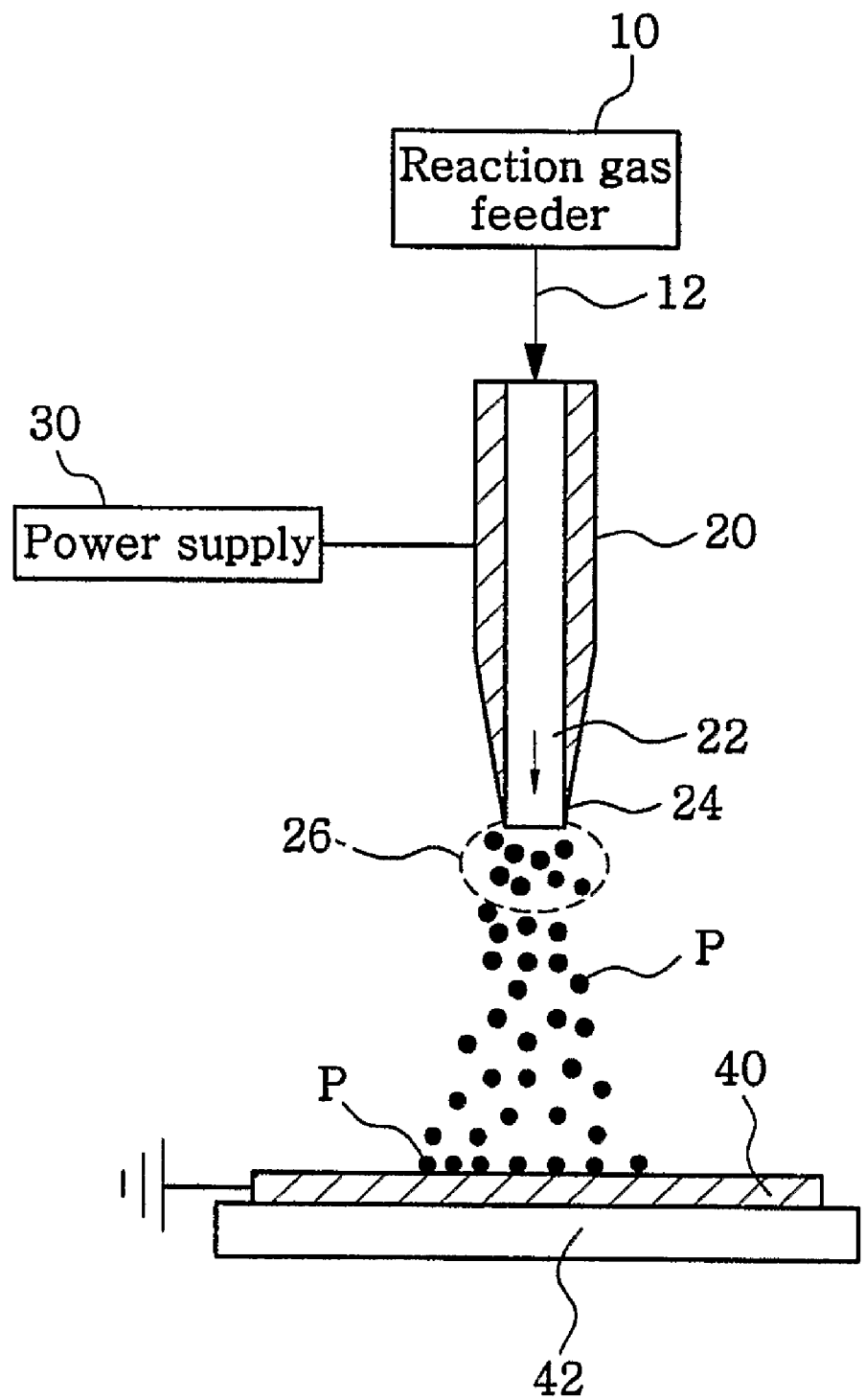
FIG. 1 is a sectional view showing a first embodiment of an apparatus for manufacturing ultra-fine particles according to the present invention.

First, FIG. 1 shows a fundamental, first embodiment of the apparatus for manufacturing ultra-fine particles according to the present invention. Referring to FIG. 1, the first embodiment of the apparatus for manufacturing ultra-fine particles comprises a reaction gas feeder 10 for supplying various reaction gases obtained from a precursor of TTIP (titanium tetraisopropoxide, $Ti(OC_3H_7)_4$), TEOS (tetraethoxyorthosilicate, $Si(OCH_2(H_3)_4$), or the like.

The reaction gas feeder 10 comprises a reaction gas source, a compressor connected to the reaction gas source to supply the reaction gas after compressing it, and a mass flow controller for controlling the flow rate of the reaction gas and supplying the reaction gas. The reaction gas source of the reaction gas obtained from the precursor comprises a reservoir for storing the precursor, a nozzle for injecting the precursor supplied from the reservoir, and a heater for heating the precursor injected from the nozzle. Since the configuration and operation of the compressor, the mass flow controller, the reservoir, the nozzle and the heater are well known, details thereof will be omitted herein. The reaction gas may be supplied after being mixed with carrier gas such as Ar, $N_2$, and He, and a carrier gas source of the carrier gas may consist of a reservoir.

In the meantime, the first embodiment of the apparatus for manufacturing ultra-fine particles comprises a nozzle 20, which is collected to the reaction gas feeder 10 through a pipeline 12 and injects the reaction gas flowing therein. The nozzle 20 includes a hole 22, which is about 1 mm or less in diameter. The nozzle 20 may be substituted with a capillary of about 1 mm or less in diameter if necessary. Although FIG. 1 shows and illustrates that the nozzle 20 is formed in a circular cylinder, it is only an example. The nozzle 20 may have a cross section of a shape such that the reaction gas can flow therein and be injected. For example, the nozzle 20 may be a slit type.

Figure 2A:
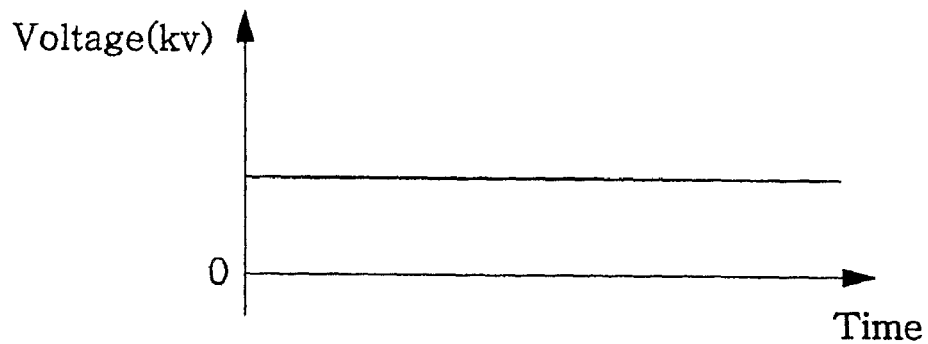
FIGS. 2a to 2f are views illustrating a high voltage applied to a nozzle by a power supply in the apparatus for manufacturing ultra-fine particles according to the present invention.
Figure 2B:
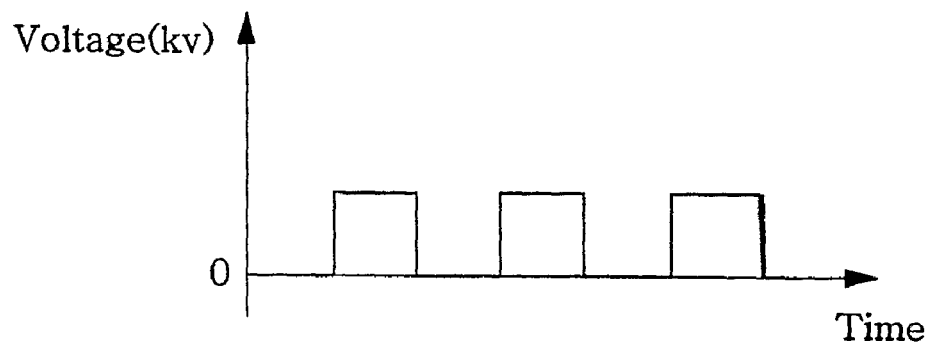
Figure 2C:
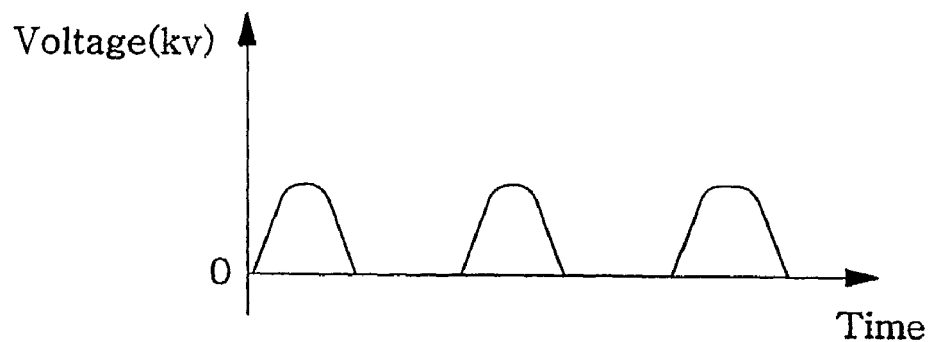
Figure 2D:
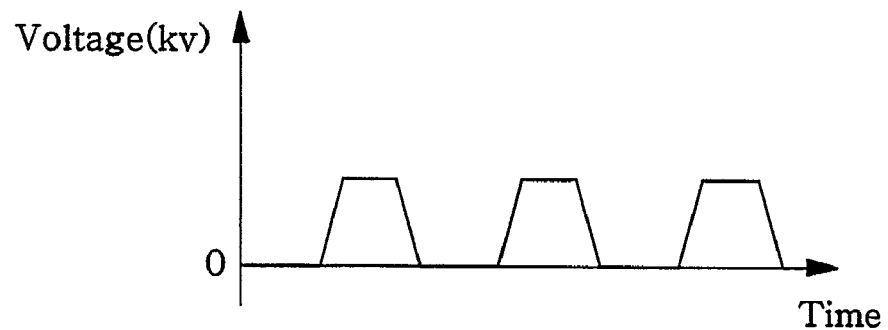
Figure 2E:
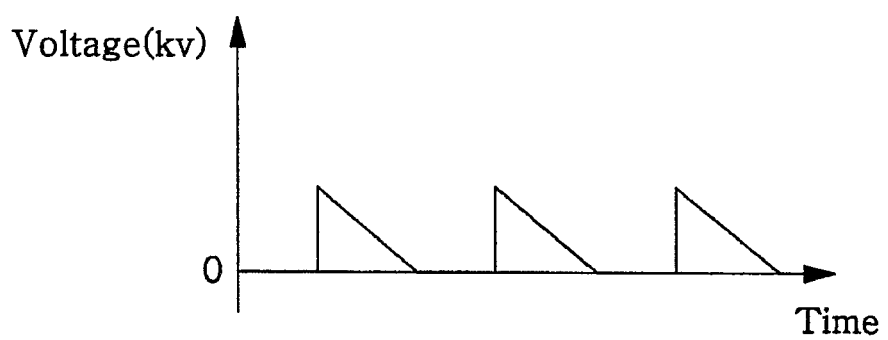
Figure 2F:
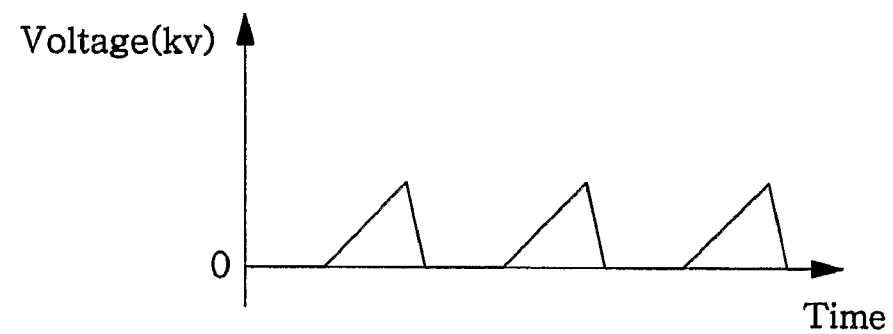

A power supply 30 is connected to the nozzle 20 in order to apply a high voltage thereto. The power supply 30 applies a constant DC voltage of 6 kV or more as shown in FIG. 2a or a high voltage of 6 kV or more in the form of a pulse shown in FIGS. 2b to 2f. The high voltage applied by the power supply 30 causes corona discharge to occurs at a tip 24 of the nozzle 20. As shown by the hidden line in FIG. 1, a corona discharge region 26 of about 1 mm or less in radius is formed by partial discharge from the tip 24 of the nozzle 20.

Referring to FIG. 1 again, the apparatus for manufacturing ultra-fine particles of the present invention comprises a collection plate 40 as a collecting means that is grounded in order to collect ultra-fine particles P produced by the corona discharge. The collection plate 40 is spaced apart by a predetermined distance from the hole 22 of the nozzle 20. A silicon wafer, a glass substrate, or the like may be used as the collection plate 40, and a filter may be substituted therefor. The collection of the ultra-fine particles P on the silicon wafer may be applied to a manufacturing process of a semiconductor. The collection of the ultra-fine particles P on the glass substrate may be applied to a manufacturing process of a flat display of TFT-LCD (thin film transistor-liquid crystal display), PDP (plasma display panel), EL (electro luminescent) or the like. The collection plate 40 may be loaded on a conveyor 42 or carriage as a delivering means and consecutively or periodically delivered.

Figure 3:
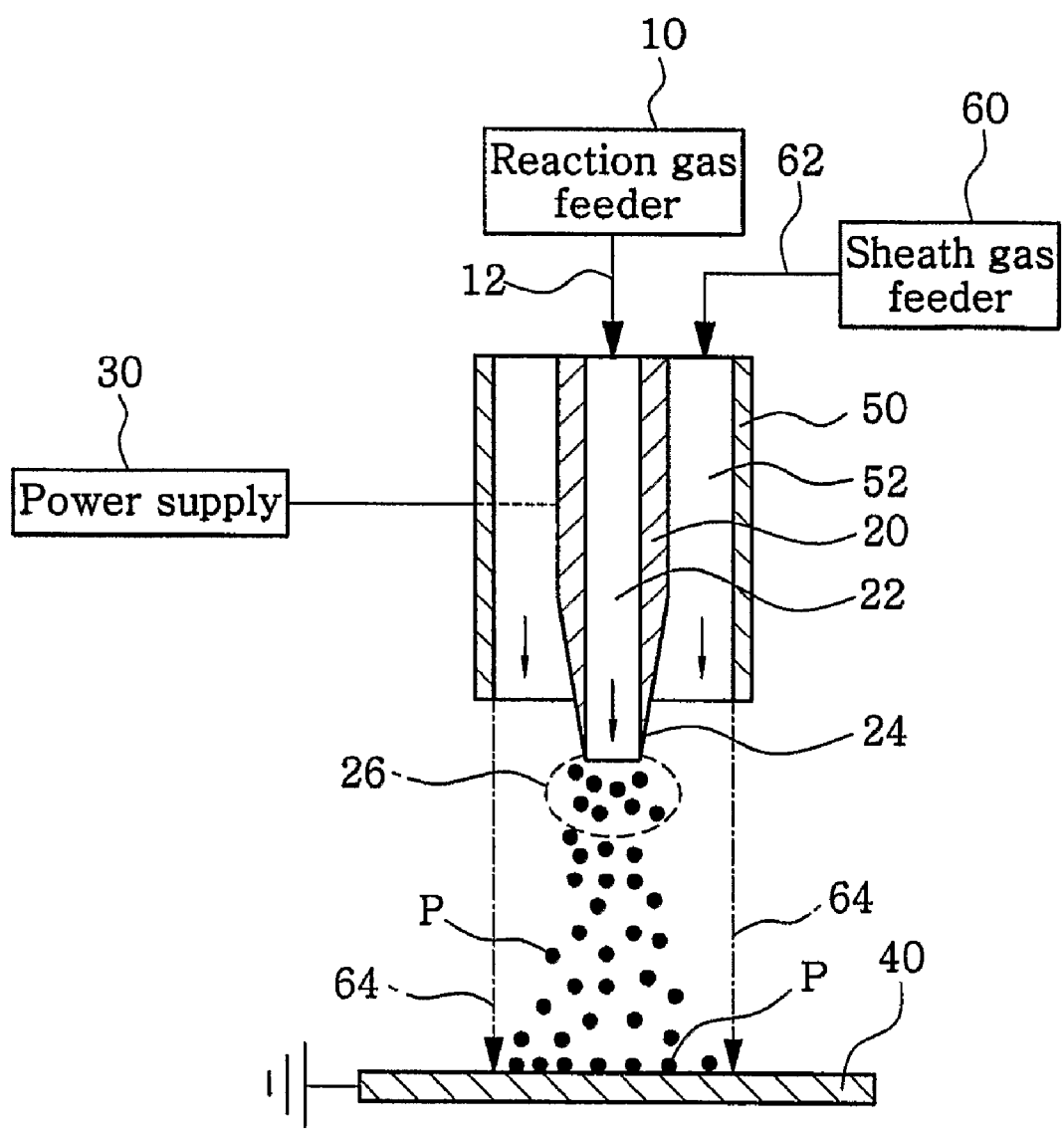
FIG. 3 is a sectional view showing a second embodiment of the apparatus for manufacturing ultra-fine particles according to the present invention.

FIG. 3 shows a second embodiment of the apparatus for manufacturing ultra-fine particles according to the present invention. Referring to FIG. 3, the second embodiment of the apparatus for manufacturing ultra-fine particles includes a reaction gas feeder 10, a nozzle 20, a power supply 30, and a collection plate 40 which are identical to those of the first embodiment of the apparatus for manufacturing ultra-fine particles. The collection plate 40 may be consecutively or periodically delivered by the conveyor 42 shown in FIG. 1. The nozzle 20 is concentrically accommodated in a cylindrical duct 50. A passage 52 is formed between an outer surface of the nozzle 20 and an inner surface of the duct 50. A tip 24 of the nozzle 20 protrudes out of the duct 50. The passage 52 of the duct 50 is connected to a pipeline 62 of a sheath gas feeder 60 for supplying sheath gas such as Ar or $N_2$. The sheath gas feeder 60 may comprise a reservoir, a compressor, and a mass flow controller that are well known. The sheath gas discharged from the passage 52 of the duct 50 forms a gas curtain 64 between the nozzle 20 and the collection plate 40, as shown by the dashed dot lines in FIG. 3.

Figure 4:
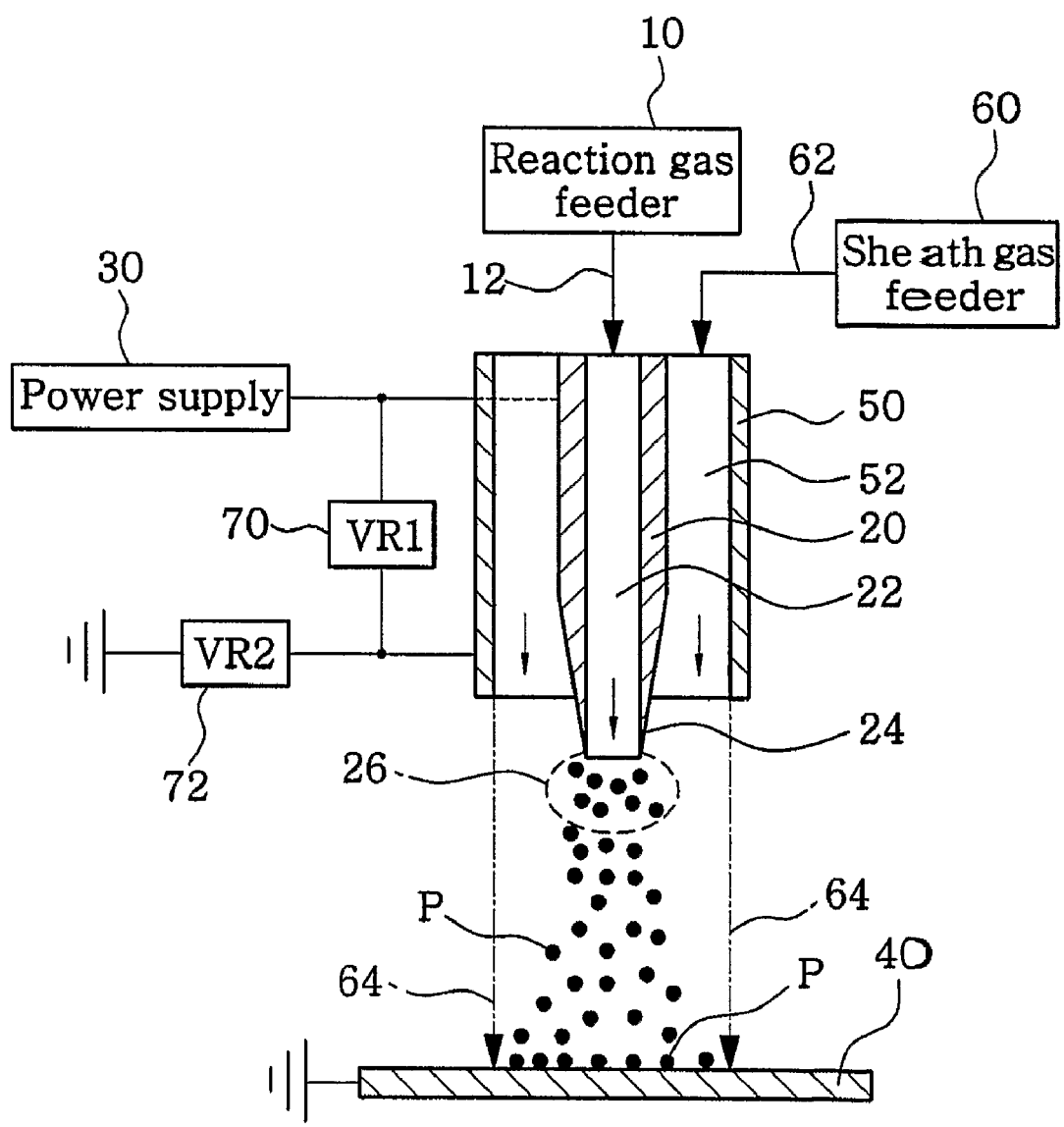
FIG. 4 is a sectional view showing a third embodiment of the apparatus for manufacturing ultra-fine particles according to the present invention.

FIG. 4 shows a third embodiment of the apparatus for manufacturing ultra-fine particles according to the present invention. Referring to FIG. 4, the third embodiment of the apparatus for manufacturing ultra-fine particles comprises a reaction gas feeder 10, a nozzle 20, a power supply 30, a collection plate 40, a duct 50, and a sheath gas feeder 60 which are identical to those of the second embodiment of the apparatus for manufacturing ultra-fine particles.

The power supply 30 is connected to a first variable resistor 70, which is connected to the duct 50. The first variable resistor 70 causes a high voltage applied from the power supply 30 to be dropped, so that a low voltage with the same polarity as the high voltage applied to the nozzle 20 is applied to the duct 50. In addition, the first variable resistor 70 is connected to a second variable resistor 72 that causes the voltage dropped by the first variable resistor 70 to be further dropped, and the second variable resistor 72 is grounded. When the first variable resistor 70 and the second variable resistor 72 are the same in resistance, the voltage applied between the nozzle 20 and the duct 50 becomes the same as the voltage applied between the duct 50 and the ground.

In the third embodiment of the apparatus for manufacturing ultra-fine particles, although the first and second variable resistors 70 and 72 are used in order to form a voltage difference between the nozzle 20 and the duct 50, fixed resistors may be used instead of the first and second variable resistors 70 and 72. Furthermore, instead of the power supply 30 and the first and second variable resistors 70 and 72, two power supplies may be used. In such a case, one of the power supplies applies a high voltage to the nozzle 20, while the other of the power supplies applies a low voltage to the duct 50.

Figure 5:
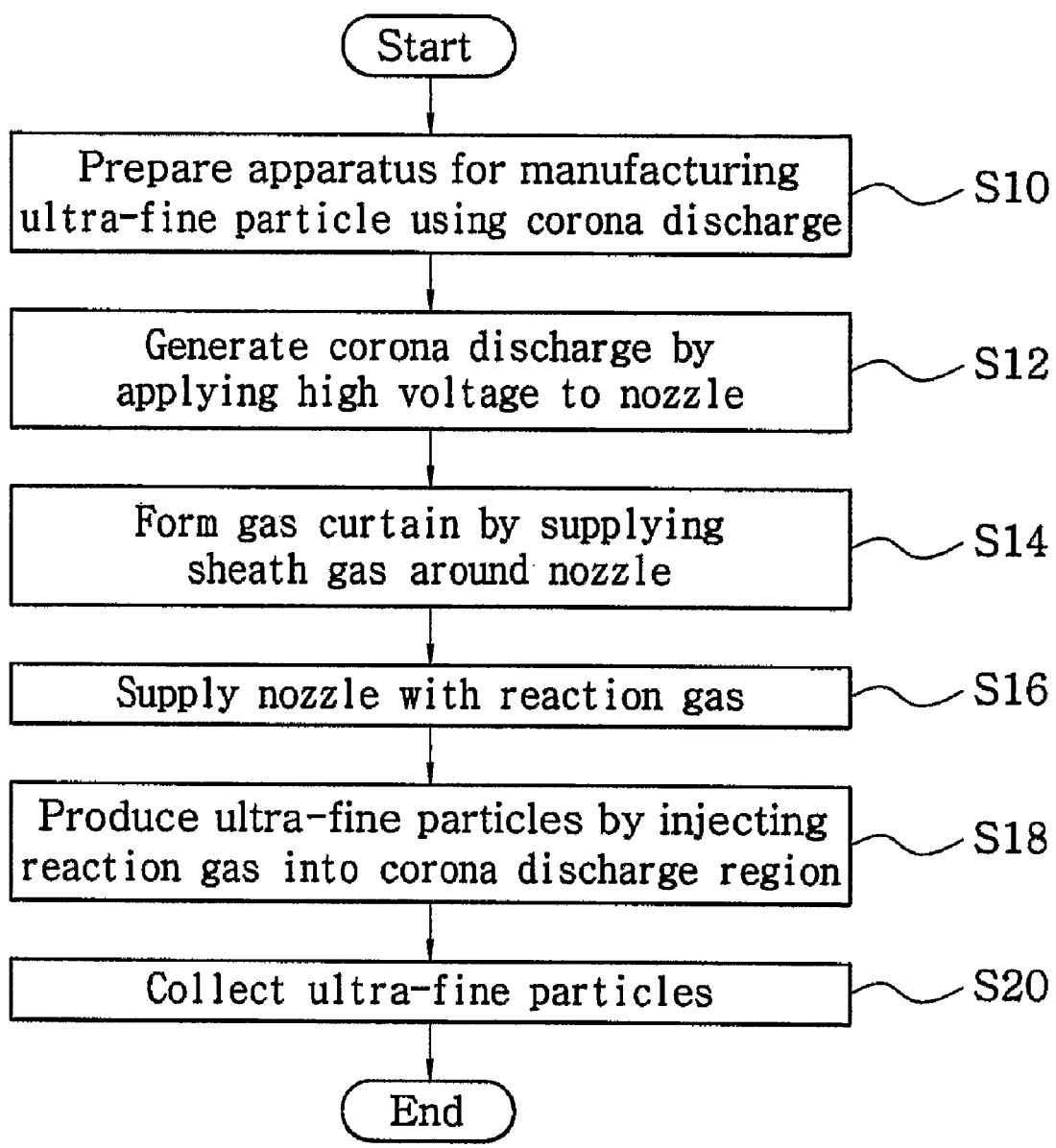
FIG. 5 is a flowchart illustrating a first embodiment of a method for manufacturing ultra-fine particles by the third embodiment of the apparatus according to the present invention.

Hereinafter, referring to FIG. 5, a first embodiment of a method for manufacturing ultra-fine particles using corona discharge according to the present invention will be described. The operation of the first to third embodiments of the apparatuses for manufacturing ultra-fine particles is generally identical to but partially different from each other. Thus, the first embodiment of the method for manufacturing ultra-fine particles will be described with the third embodiment of the apparatus for manufacturing ultra-fine particles.

Figure 6:
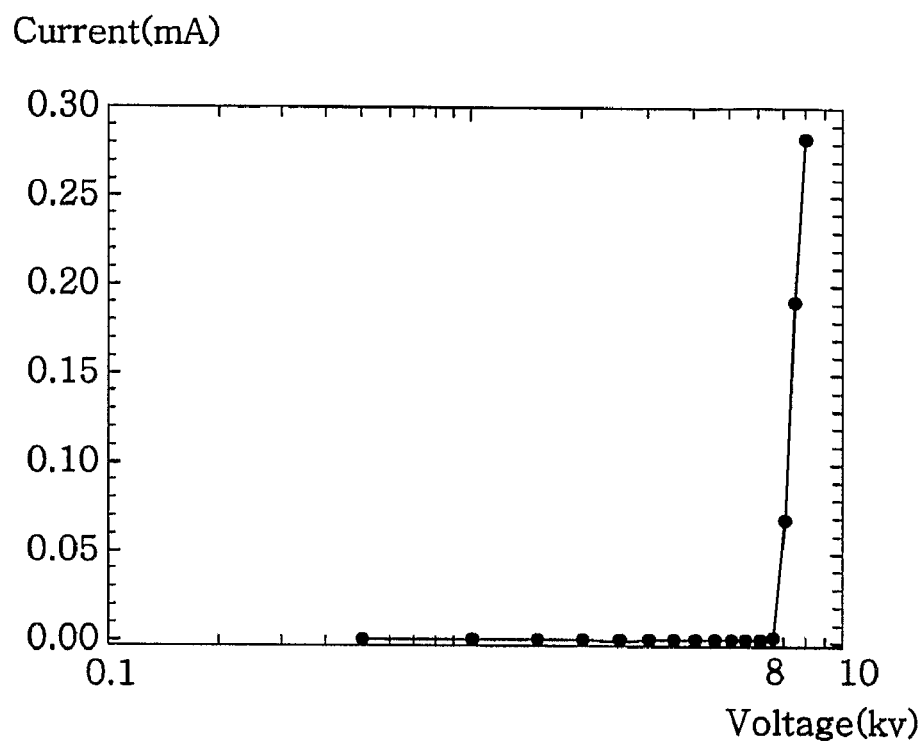
FIG. 6 is a graph illustrating a characteristic curve of current and voltage of the nozzle in the apparatus for manufacturing ultra-fine particles according to the present invention.

First, there is prepared the third embodiment of the apparatus for manufacturing ultra-fine particles using the corona discharge (step S10). After the third embodiment of the apparatus for manufacturing ultra-fine particles is prepared, the power supply 30 applies a high voltage to the nozzle 20, thus generating the corona discharge (step S12). The power supply 30 applies a high constant DC voltage to the nozzle 20 as shown in FIG. 2a, the high voltage is dropped to a low voltage through the first variable resistor 70, and then, the low voltage is applied to the duct 50. The high voltage applied from the power supply 30 causes the corona discharge to occur at the tip 24 of the nozzle 20. Thus, the corona discharge causes a corona discharge region 26 of about 1 mm in radius to be formed at the tip 24 of the nozzle 20, as shown by the hidden line in FIGS. 1, 3, and 4. Numbers of ions and electrons with high energy are generated in the corona discharge region 26 of the nozzle 20. It is noted from a characteristic curve of current and voltage of the nozzle illustratively shown in FIG. 6 that the corona discharge occurs when a high voltage of about 8~10 kv is applied to the nozzle 20.

Next, when the sheath gas feeder 60 supplies the passage 52 of the duct 50 with sheath gas, the sheath gas supplied to the passage 52 of the duct 50 flows downstream, and then the gas curtain 64 enclosing the corona discharge region 26 is formed between the collection plate 40 and the duct 50, as shown by the dashed dot lines in FIGS. 3 and 4 (step S14). The gas curtain 64 is a laminar flow, and prevents the fluid from flowing between the inside and outside of the gas curtain 64.

Figure 7A:
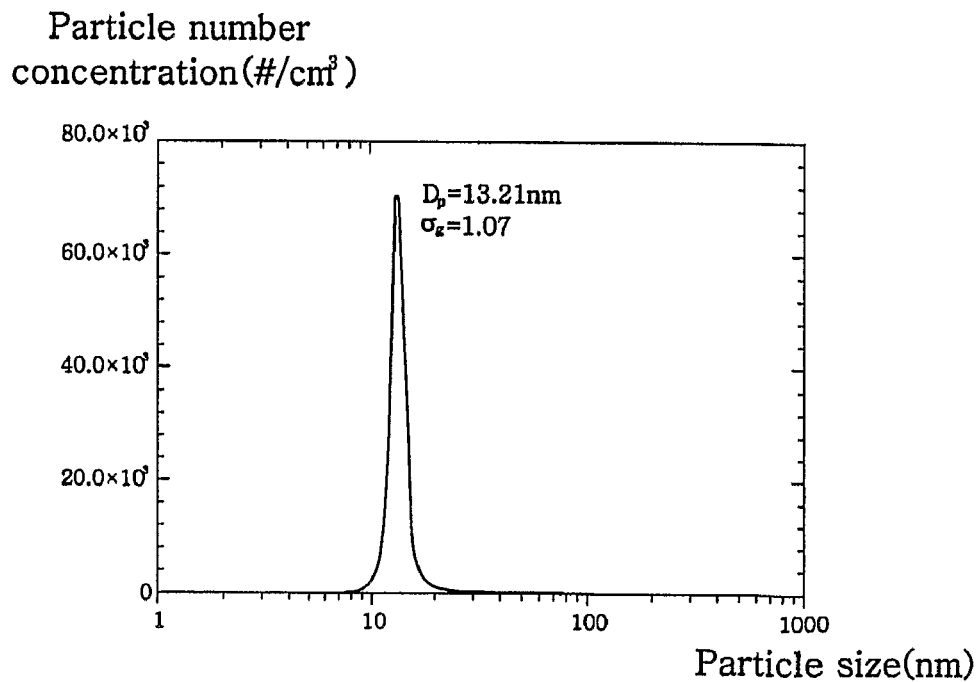
FIGS. 7a and 7b are graphs illustrating a size distribution of the ultra-fine particles manufactured by the apparatus according to the present invention.
Figure 7B:
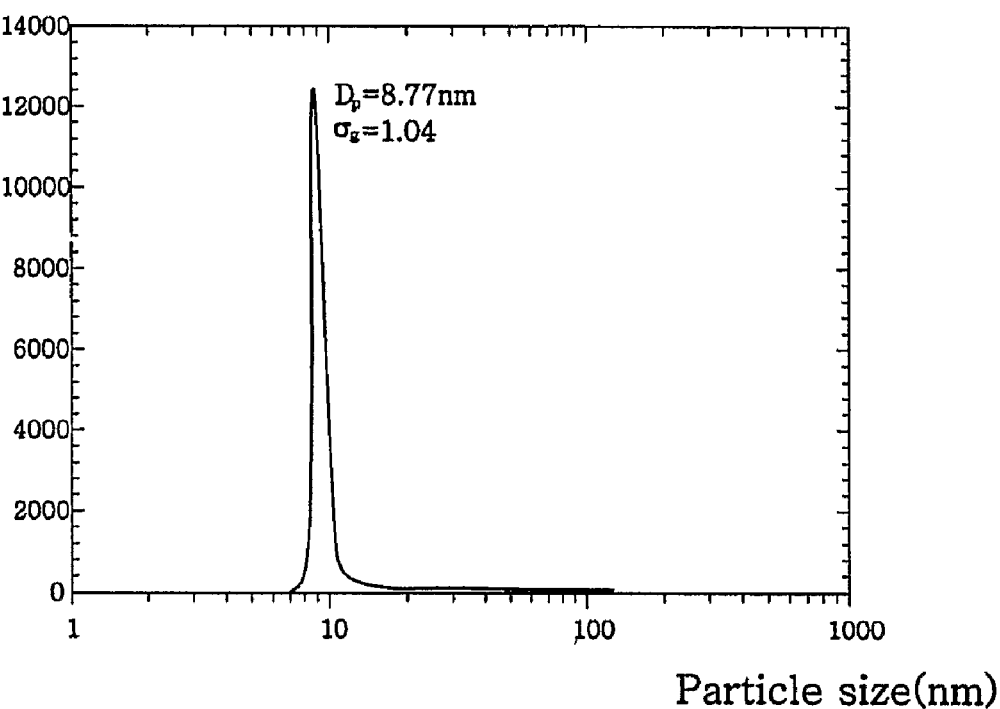

When the reaction gas feeder 10 supplies the nozzle 20 with the reaction gas (step S16), the reaction gas injected into the corona discharge region 26 through the hole 22 of the nozzle 20 is dissolved by ions with high energy, so that numbers of the ultra-fine particles P are produced (step S18). The ultra-fine particles P as described above produced by the apparatus for manufacturing ultra-fine particles of the present invention is about 10 nm, which is very fine as known from the size distribution of the ultra-fine particles shown in FIGS. 7a and 7b. Referring to FIGS. 7a and 7b, the geometric standard deviation ($\sigma_g$) is 1.07 when the particle diameter (Dp) is 13.21 nm while the geometric standard deviation ($\sigma_g$) is 1.04 when the particle diameter (Dp) is 8.77 nm. Considering that the diameters of all particles are completely the same when the geometric standard deviation ($\sigma_g$) is 1, it is noted that particles with nearly uniform size are manufactured according to the present invention. In addition, since the ultra-fine particles P are charged to the same polarity by the ions, electrical repulsive forces occur between the ultra-fine particles P, so that the cohesion therebetween does not occur. Since the ultra-fine particles P are maintained at the normal temperature when they leave the corona discharge region 26, coalescence due to collision between the ultra-fine particles P does not occur.

In succession, the gas curtain 64 formed by the sheath gas prevents the diffusion of the ultra-fine particles P from getting out of the corona discharge region 26 and leads the ultra-fine particles P to the laminar flow, so that the ultra-fine particles P are collected on the collection plate 40 (step S20). At this time, since the low voltage of the same polarity as the high voltage applied to the nozzle 20 is applied to the duct 50, the ultra-fine particles P are not attached thereto. Thus, loss of ultra-fine particles P is minimized, so that it is possible to greatly increase the collection rate.

In the meantime, referring to FIG. 1, while the collection plate 40 is periodically delivered by the conveyor 42, the ultra-fine particles P are collected on the collection plate 40. In such a case, the power supply 30 applies the nozzle 20 with the high voltage in the form of the pulse shown in FIGS. 2b to 2f corresponding to the delivery period of the collection plate 40. The delivery of the collection plate 40 and the collection of the ultra-fine particles P cause a silicon wafer or a glass substrate to be effectively coated with metal oxides of various forms.

Figure 8:
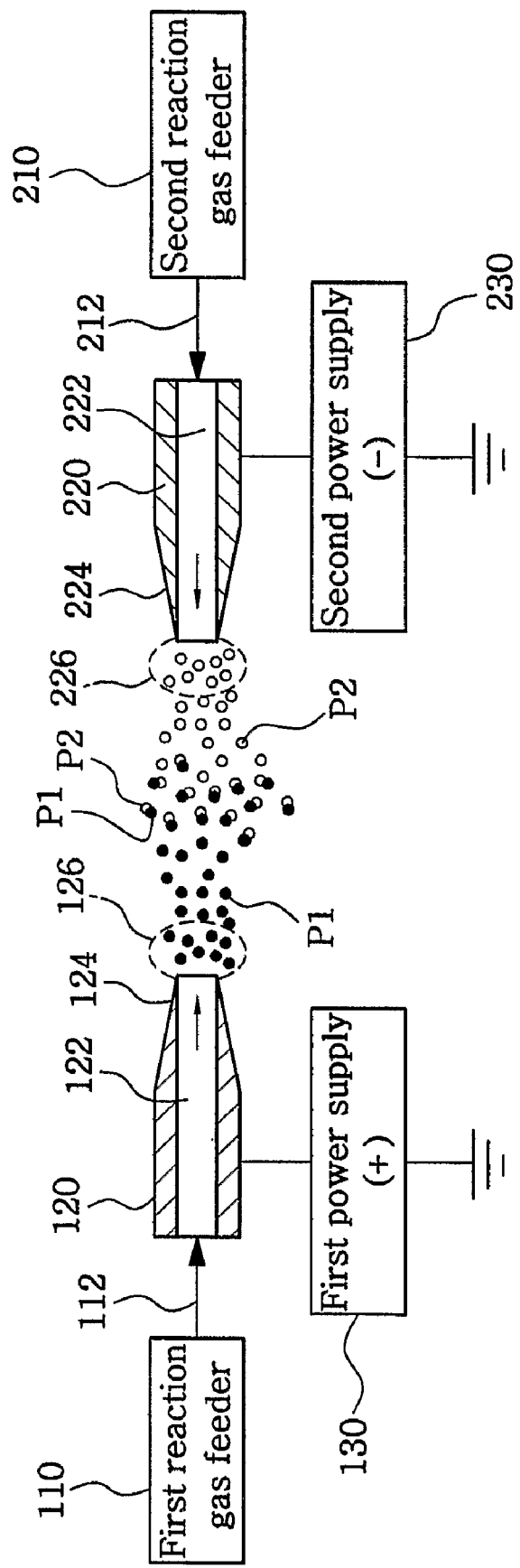
FIG. 8 is a sectional view showing a fourth embodiment of the apparatus for manufacturing ultra-fine particles according to the present invention.

FIG. 8 shows a fourth embodiment of the apparatus for manufacturing ultra-fine particles according to the present invention. Referring to FIG. 8, the fourth embodiment of the apparatus for manufacturing ultra-fine particles comprises first and second reaction gas feeders 110 and 210, first and second nozzles 120 and 220, and first and second power supplies 130 and 230 which are the same as the reaction gas feeder 10, the nozzle 20, the power supply 30 of the first to third embodiments of the apparatus for manufacturing ultra-fine particles, respectively. The first nozzle 120 and the second nozzle 220 are faced to and spaced by a predetermined distance from each other.

The first power supply 130 and the second power supply 230 apply high voltages with opposite polarities to the first nozzle 120 and the second nozzle 220, respectively, so that corona discharges occur at the tip 124 of the first nozzle 120 and the tip 224 of the second nozzle 220. For example, the first power supply 130 applies a high voltage with a positive polarity to the first nozzle 120 while the second power supply 230 applies a high voltage with a negative polarity to the second nozzle 220. The first reaction gas feeder 110 and the second reaction gas feeder 210 supply first and second reaction gas, which differ from each other, to a hole 122 of the first nozzle 120 and a hole 222 of the second nozzle 220 connected to pipelines 112 and 212, respectively. First ultra-fine particles P1 passing through a corona discharge region 126 of the first nozzle 120 are charged to the positive polarity while second ultra-fine particles P2 passing through a corona discharge region 226 of the second nozzle 220 are charged to the negative polarity. The first ultra-fine particles P1 with the positive polarity and the second ultra-fine particles P2 with the negative polarity adhere to each other at an intermediate region between the first nozzle 120 and the second nozzle 220. Thus, ultra-fine particle mixture, in which the first ultra-fine particles P1 and the second ultra-fine particles P2 are mixed at a certain rate, can be obtained.

In the meantime, when any one of the first and second nozzles 120 and 220, for example, the second nozzle 220 is grounded, the second power supply 230 may be removed. In such a case, when the first power supply 130 applies a high voltage to the first nozzle 120, a high voltage difference occurs between the first nozzle 120 and the second nozzle 220, so that the corona discharge occurs at the tip 124 of the first nozzle 120 and the tip 224 of the second nozzle 220.

Figure 9:
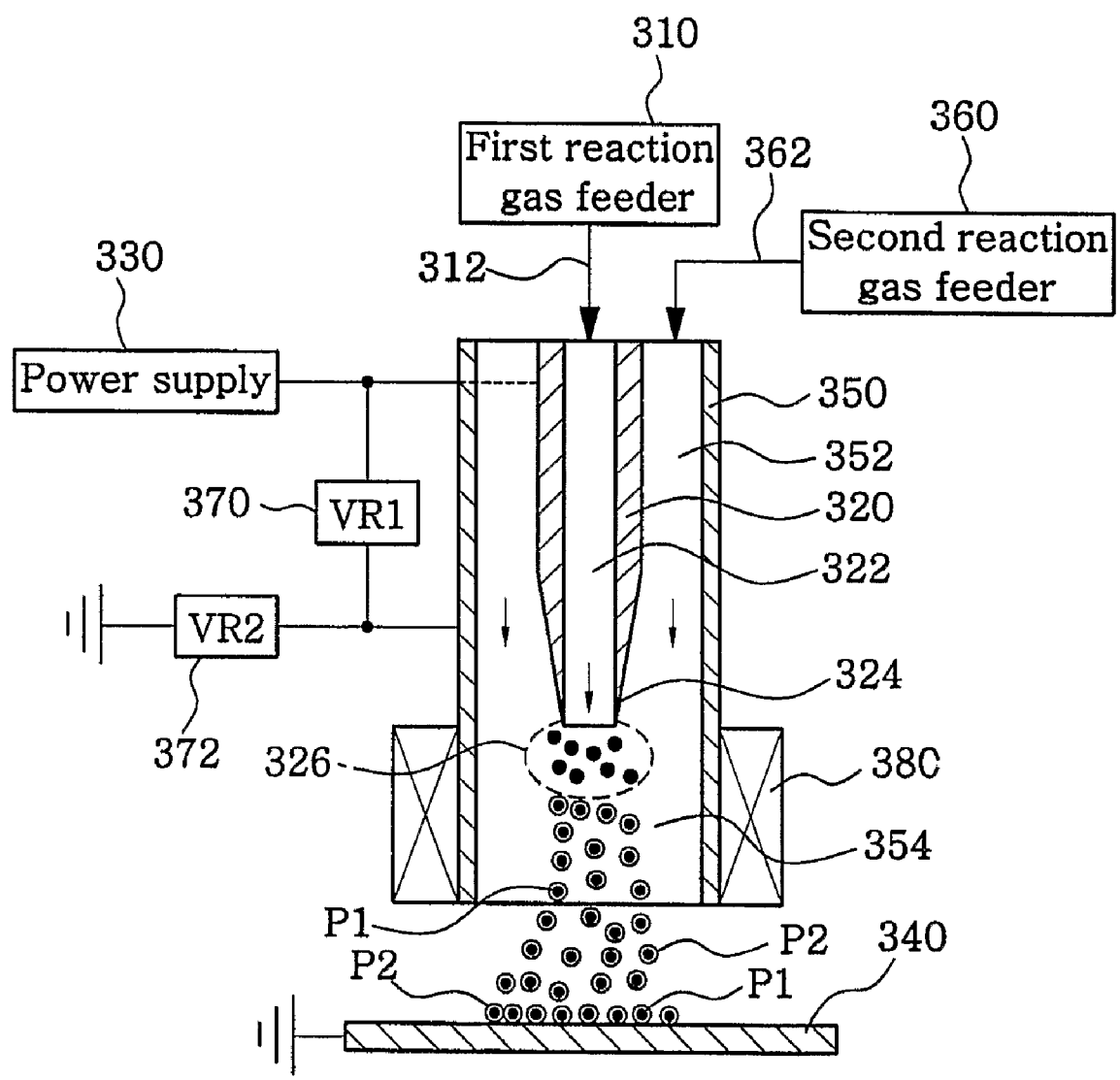
FIG. 9 is a sectional view showing a fifth embodiment of the apparatus for manufacturing ultra-fine particles according to the present invention.

FIG. 9 shows a fifth embodiment of the apparatus for manufacturing ultra-fine particles according to the present invention. Referring to FIG. 9, the fifth embodiment of the apparatus for manufacturing ultra-fine particles comprises first and second reaction gas feeders 310 and 360, a nozzle 320, a power supply 330, and a collection plate 340, which are the same as the reaction gas feeder 10, the nozzle 20, the power supply 30, and the collection plate 40 of the first to third embodiments of the apparatus for manufacturing ultra-fine particles, respectively.

The first reaction gas feeder 310 supplies first reaction gas into a hole 322 in the nozzle 320 through a pipeline 312. The nozzle 320 is accommodated in a duct 350 upstream thereof. A passage 352 is formed between an outer surface of the nozzle 320 and an inner surface of the duct 350. A reaction region 354 enclosed by the duct 350 is formed below the nozzle 320. The second reaction gas feeder 360 supplies a second reaction gas into the passage 352 of the duct 350 through a pipeline 362.

The power supply 330 is connected to a first variable resistor 370, which is connected to the duct 350. The first variable resistor 370 causes the high voltage applied from the power supply 330 to be dropped, so that a low voltage of the same polarity as the high voltage applied to the nozzle 320 is applied to the duct 350. In addition, the first variable resistor 370 is connected to a second variable resistor 372 that causes the voltage dropped by the first variable resistor 370 to be further dropped, and the second variable resistor 372 is grounded. An outer surface of a lower portion of the duct 350 past a tip 324 of the nozzle 320 is provided with a heater 380 as a heating means that applies heat energy to the second reaction gas in order to coat first ultra-fine particles P1 obtained from the first reaction gas in the reaction region 354 with second ultra-fine particles P2 obtained from the second reaction gas. The heater 380 may be substituted with an ultraviolet lamp for irradiating ultraviolet rays or an infrared lamp for irradiating infrared rays.

In the fifth embodiment of the apparatus for manufacturing ultra-fine particles so configured, if the reaction region 354 is maintained at high temperature by heat from the heater 380, the second reaction gas passing through the passage 352 of the duct 350 and introduced into the reaction region 354 reacts thermochemically. Surfaces of the first ultra-fine particles P1 passing through a corona discharge region 326 of the nozzle 320 and introduced into the reaction region 354 of the duct 350 are coated with the second ultra-fine particles P2 that react thermochemically. The first ultra-fine particles P1 coated with the second ultra-fine particles P2 are collected on the collection plate 340. At this time, for example, when the first reaction gas feeder 310 supplies the hole 322 of the nozzle 320 with the first reaction gas obtained from TEOS and the second reaction gas feeder 360 supplies to the passage 352 of the duct 350 with the second reaction gas from TTIP, $SiO_2$ produced from the first reaction gas is coated with $TiO_2$ produced from the second reaction gas. As a result, it is possible to manufacture $SiO_2$ coated with $TiO_2$.

Figure 10:
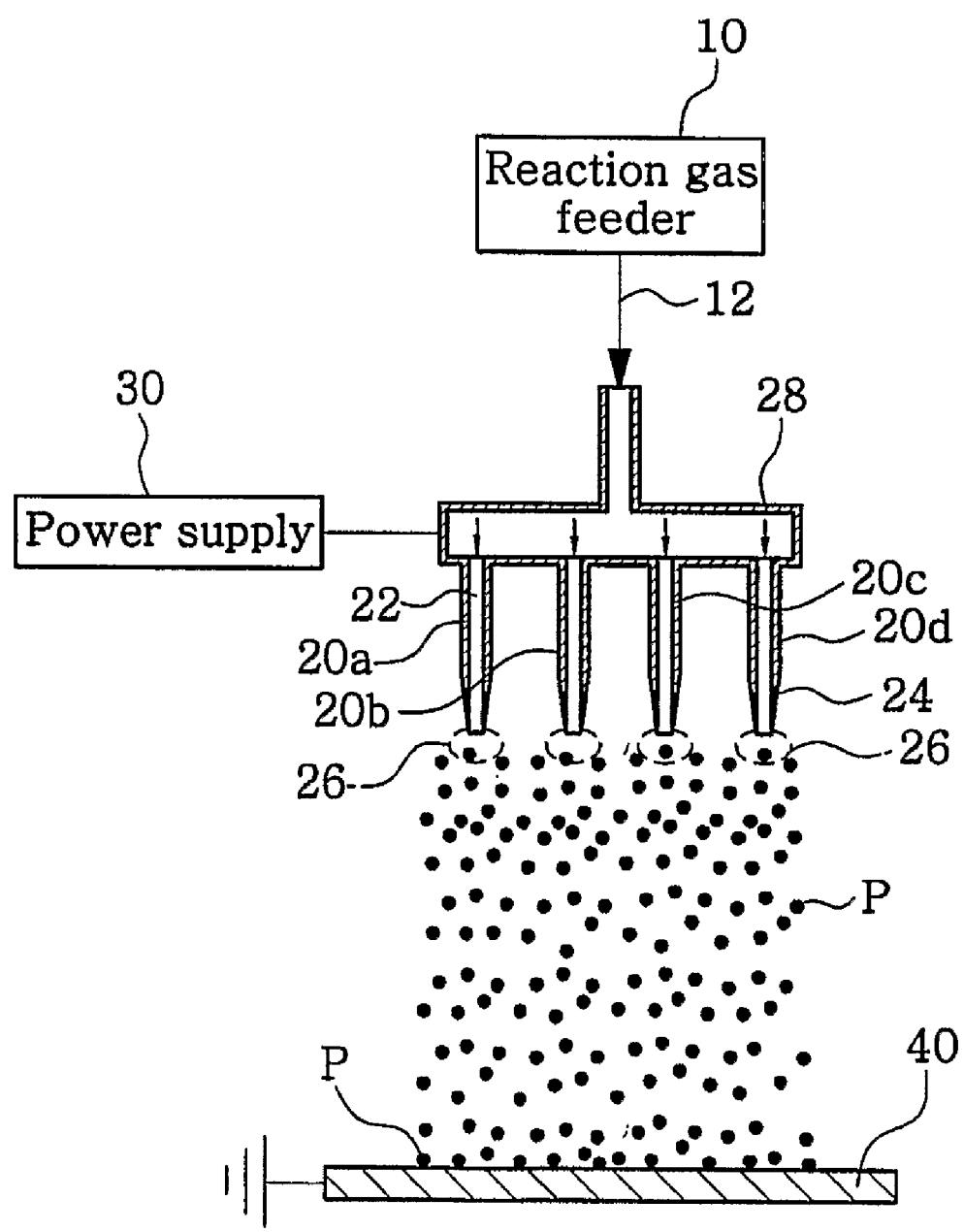
FIG. 10 is a sectional view showing a sixth embodiment of the apparatus for manufacturing ultra-fine particles according to the present invention.

FIG. 10 shows a sixth embodiment of the apparatus for manufacturing ultra-fine particles according to the present invention. Referring to FIG. 10, four nozzles 20a to 20d are connected to a hollow connection pipe 28, which is connected to a pipeline 12 of a reaction gas feeder 10. A power supply 30 applies a high voltage to the connection pipe 28 while a collection plate 40 spaced apart from tips 24 of the nozzles 20a to 20d is grounded. Although FIG. 10 shows the four nozzles 20a~20d, the number of the nozzles may be increased and decreased according to necessity. In addition, the collection plate 40 may be consecutively or periodically delivered by the conveyor 42 illustrated in FIG. 1.

In the sixth embodiment of the apparatus for manufacturing ultra-fine particles so configured, when the power supply 30 supplies the connection pipe 28 with the high voltage, corona discharge occurs at the tips 24 of the respective nozzles 20a~20d, so that corona discharge regions 26 are formed. Thus, a large number of the ultra-fine particles P may be manufactured as compared with using a single nozzle. The nozzles 20a~20d of the sixth embodiment of the apparatus for manufacturing ultra-fine particles can be applied to the second to fifth embodiments of the apparatus for manufacturing ultra-fine particles.

Figure 11:
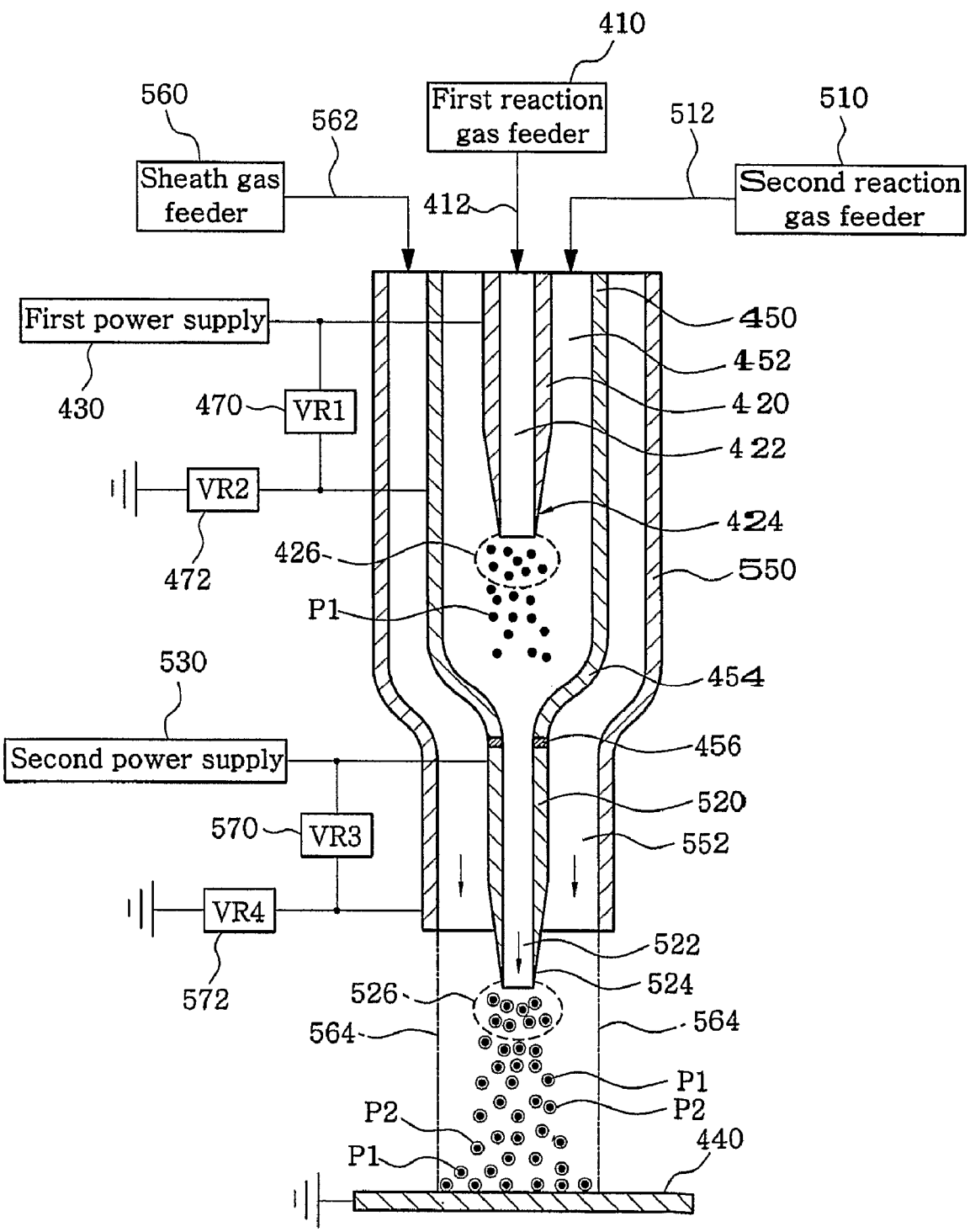
FIG. 11 is a sectional view showing a seventh embodiment of the apparatus for manufacturing ultra-fine particles according to the present invention.

FIG. 11 shows a seventh embodiment of the apparatus for manufacturing ultra-fine particles. Referring to FIG. 11, the seventh embodiment of the apparatus for manufacturing ultra-fine particles comprises first and second reaction gas feeders 410 and 510, first and second nozzles 420 and 520, first and second power supplies 430 and 530, and a collection plate 440 that are the same as the reaction gas feeder 10, the nozzle 20, the power supply 30, the collection plate 40 of the first to third embodiments of the apparatus for manufacturing ultra-fine particles, respectively.

The first nozzle 420 is entirely accommodated in a cylindrical first duct 450 so as to be positioned upstream of a second nozzle 520. A passage 452 is formed between an outer surface of the first nozzle 420 and an inner surface of the first duct 450. Downstream of the first duct 450, a funnel 454 is formed which has a reduced cross section compared with its upstream and leads the discharge of first ultra-fine particles P1 passing through a corona discharge region 426 of the first nozzle 420. The second reaction gas feeder 510 supplies second reaction gas to the passage 452 of the first duct 450 through a pipeline 512.

The first power supply 430 is connected to a first variable resistor 470, which is connected to the first duct 450. The first variable resistor 470 drops a high voltage applied from the first power supply 430, so that a low voltage with the same polarity as the high voltage applied to the first nozzle 420 is applied to the first duct 450. In addition, the first variable resistor 470 is connected to a second variable resistor 472 that causes the voltage dropped by the first variable resistor 470 to be further dropped, and the second variable resistor 472 is grounded. An insulation coupling 456 is mounted at a distal end of the funnel 454, and is mounted with the second nozzle 520 to be coaxial with the first nozzle 420. The second reaction gas and the first ultra-fine particles P1 flowing along the passage 452 of the first duct 450 are injected through a hole 522 of the second nozzle 520. A second power supply 530 applies a high voltage to the second nozzle 520, so that the corona discharge occurs at the tip 524 of the second nozzle 520. In addition, the collection plate 440 is spaced apart by a predetermined distance forwardly from the second nozzle 520.

The first duct 450 and the second nozzle 520 are concentrically accommodated in a cylindrical duct 550. Further, a passage 552 is formed between an outer surface of the nozzle 520 and the inner surface of the duct 550. The tip 524 of the second nozzle 520 protrudes out of the second duct 550. The passage 552 of the duct 550 is connected to a pipeline 562 of a sheath gas feeder 560 for supplying sheath gas. The second power supply 530 is connected to a third variable resistor 570 for dropping the high voltage applied to the second nozzle 520 like the first variable resistor 470, and the third variable resistor 570 is connected to the duct 550. In addition, the third variable resistor 570 is connected to a fourth variable resistor 572 that is grounded.

Meanwhile, in the seventh embodiment of the apparatus for manufacturing ultra-fine particles, the collection plate 440 may be consecutively or periodically delivered by the conveyor 42 illustrated in FIG. 1, and the first nozzle 420 and the second nozzle 520 may be substituted with the nozzles 20a~20d illustrated in FIG. 10. In addition, the passage 552 of the second duct 550 may be supplied with third reaction gas instead of the sheath gas, and a heater may be installed on an outer surface of the second duct 550 to applying heat energy to the third reaction gas.

Figure 12:
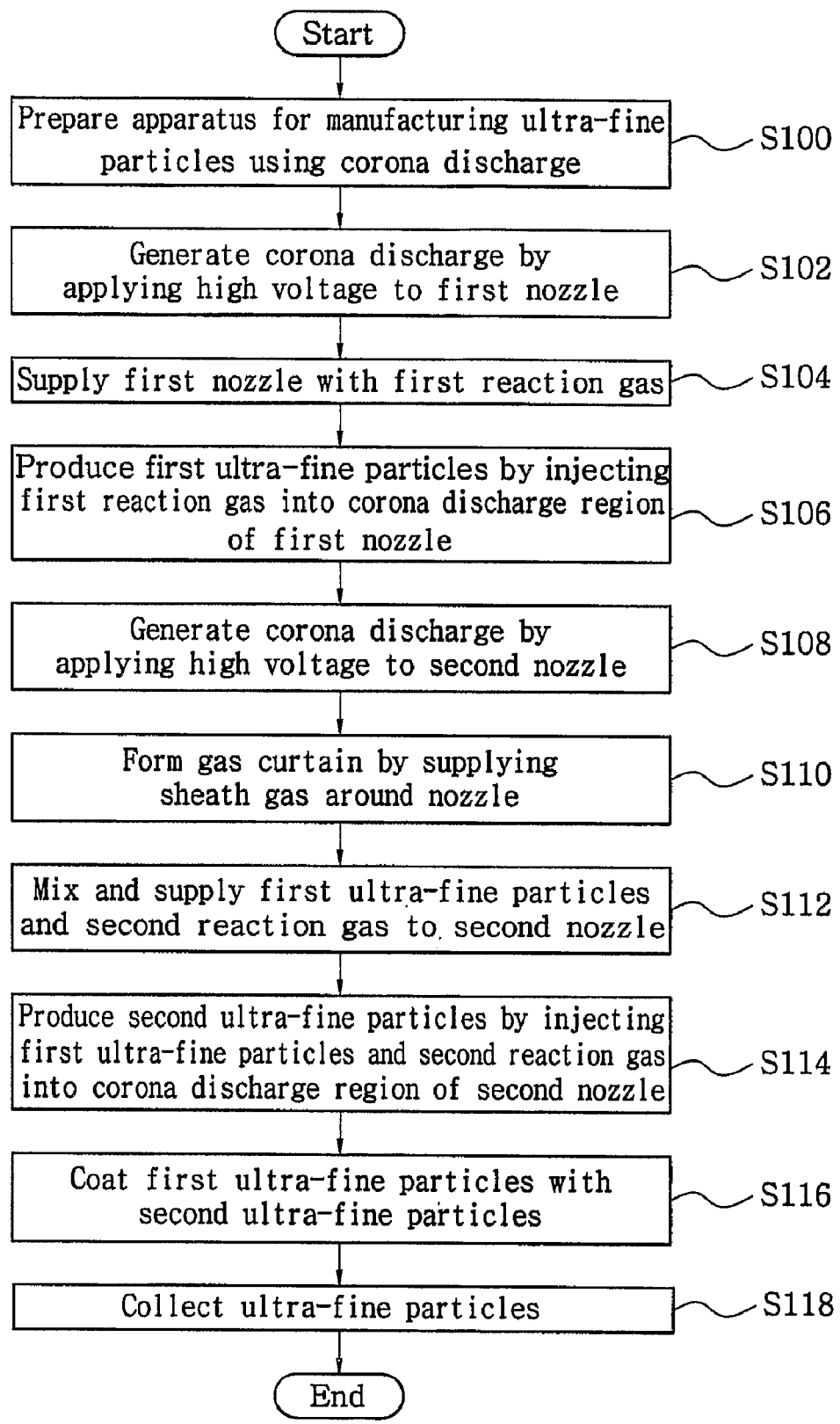
FIG. 12 is a flowchart illustrating a second embodiment of the method for manufacturing ultra-fine particles by the seventh embodiment of the apparatus according to the present invention.

Hereinafter, referring to FIG. 12, a second embodiment of the method for manufacturing ultra-fine particles by the seventh embodiment of the apparatus will be described.

First, there is prepared the seventh embodiment of the apparatus for manufacturing ultra-fine particles (step S100). After the seventh embodiment of the apparatus for manufacturing ultra-fine particles is prepared, the first power supply 430 applies the high voltage to the first nozzle 420, so that the corona discharge occurs (step S102). A first reaction gas, for example, obtained from TEOS is supplied into a hole 422 in the first nozzle 420 through a pipeline 412 of the first reaction gas feeder 410 (step S104). The first nozzle 420 injects the first reaction gas into a corona discharge region 426 formed by the corona discharge, so that the first reaction gas is dissolved by ions in the corona discharge region 426 and a large number of first ultra-fine particles P1 are produced (step S106). At this time, the first ultra-fine particles P1 of $SiO_2$ can be obtained by the first reaction gas obtained from the TEOS.

Next, the second power supply 530 supplies the high voltage to the second nozzle 520, so that the corona discharge occurs (step S108). When the sheath gas is supplied into the passage 552 of the second duct 550 through the pipeline 562 of the sheath gas feeder 560, the sheath gas supplied to the passage 552 of the second duct 550 flows downstream and forms a gas curtain 564 enclosing a corona discharge region 526 of the second nozzle 520 between the collection plate 440 and the second duct 550, as shown by the dashed dot lines in FIG. 11 (step S110). When the second reaction gas, for example, obtained from TTIP is supplied to the passage 452 of the first duct 450 through the pipeline 512 of the second reaction gas feeder 510, while passing through the passage 452 of the first duct 450, the first ultra-fine particles P1 and the second reaction gas are mixed and thus supplied to the hole 522 of the second nozzle 520 (step S112).

Furthermore, the second nozzle 520 injects the mixed gas of the first ultra-fine particles P1 and the second reaction gas into the corona discharge region 526 formed by the corona discharge. At this time, the first ultra-fine particles P1 of $SiO_2$ that pass through the corona discharge region 526 of the second nozzle 520 are not ionized again and are charged, and its charge quantity is large enough to be up to the Rayleigh charge limit. In addition, the second reaction gas obtained from TTIP passing through the corona discharge region 526 of the second nozzle 520 causes the second ultra-fine particles P2 of $TiO_2$ to be produced (step S114). The first ultra-fine particles P1 of $SiO_2$ as cores are coated with the second ultra-fine particles P2 of $TiO_2$ (step S116). As a result, it is possible to manufacture $SiO_2$ coated with $TiO_2$. Finally, the flow of the first ultra-fine particles P1 coated with the second ultra-fine particles P2 is led by the gas curtain 564, so that they are collected on the collection plate 440 (step S118).

In the meantime, if the third reaction gas is supplied to the passage 552 of the second duct 550 and heat energy is applied to the third reaction gas after installing a heater on the outer surface of the second duct 550, $TiO_2$ is coated with new ultra-fine particles produced by thermochemical reaction of the third reaction gas. Thus, ultra-fine particles with multilayered coatings can be simply manufactured.

The embodiments described above are only various practicable embodiments that manufacturing ultra-fine particles according to the present invention. The scope of the present invention is not limited to the embodiments described above. It will be apparent that those skilled in the art can make various modifications, changes, and substitutions within the technical spirit of the invention and the scope defined by the claims. It is understood that such embodiments pertain to the scope of the present invention.

INDUSTRIAL APPLICABILITY

As described above, according to the apparatus and method for manufacturing ultra-fine particles using corona discharge of the present invention, it is possible to manufacture uniform ultra-fine particles nanometers in size from reaction gas by corona discharge and to improve the collection rate of the ultra-fine particles. In addition, heterogeneous ultra-fine particles adhere to each other or ultra-fine particles are effectively coated with other ultra-fine particles, so that it is possible to simply and effectively manufacture new ultra-fine particles.

The invention claimed is:

1. An apparatus for manufacturing ultra-fine particles using corona discharge, comprising:
    means for supplying reaction gas;
    at least one nozzle connected to the means for supplying reaction gas, configured for injecting reaction gas flowing therein, and configured for producing a number of ultra-fine particles by corona discharge of injected reaction gas;
    means for applying a voltage to the at least one nozzle and configured for causing corona discharge at the at least one nozzle; and
    means for collecting ultra-fine particles produced by corona discharge.

2. The apparatus as claimed in claim 1, further comprising a duct enclosing the at least one nozzle and configured for forming a passage between the at least one nozzle and the duct, and means for supplying sheath gas to the passage of the duct in order to form a gas curtain that leads flow of ultra-fine particles between the at least one nozzle and the means for collecting.

3. The apparatus as claimed in claim 2, further comprising a first variable resistor configured for dropping a high voltage applied from the means for applying a voltage to a low voltage and configured for applying a low voltage to the duct, and a second variable resistor connected to the first variable resistor and grounded.

4. The apparatus as claimed in claim 2, wherein a tip of the at least one nozzle extrudes out the duct, the apparatus further comprising means for delivering the means for collecting.

5. An apparatus for manufacturing ultra-fine particles using corona discharge, comprising:
    means for supplying a first reaction gas;
    at least one first nozzle connected to the means for supplying a first reaction gas, configured for injecting the first reaction gas flowing therein, and configured for producing a number of first ultra-fine particles by corona discharge of injected first reaction gas;
    means for applying a first voltage to the at least one first nozzle and configured for causing corona discharge at the at least one first nozzle;
    means for supplying a second reaction gas different from the first reaction gas;
    at least one second nozzle faced to and spaced from the at least one first nozzle, connected to the means for supplying a second reaction gas, configured for injecting the second reaction gas flowing therein, and configured for producing a number of second ultra-fine particles by corona discharge of injected second reaction gas; and
    means for applying a second voltage at the at least one second nozzle and configured for causing corona discharge at the at least one second nozzle in order for the first ultra-fine particles and the second ultra-fine particles to adhere to each other between the at least one first nozzle and the at least one second nozzle.

6. An apparatus for manufacturing ultra-fine particles using corona discharge, comprising:
    means for supplying a first reaction gas;
    at least one nozzle connected to means for supplying a first reaction gas, configured for injecting the first reaction gas flowing therein, and configured for producing a number of first ultra-fine particles by corona discharge of injected first reaction gas;
    means for applying a high voltage to the at least one nozzle and configured for causing corona discharge at the at least one nozzle;
    a duct enclosing the at least one nozzle and configured for forming a passage between the at least one nozzle and the duct;
    means for supplying the passage of the duct with a second reaction gas different from the first reaction gas;
    means for heating installed on an outer surface of the duct and configured for providing heat energy to the second reaction gas in order to coat the first ultra-fine particles with a number of second ultra-fine particles, when the second ultra-fine particles are obtained by thermochemical reaction of the second reaction gas; and
    means for collecting spaced from the duct and configured for collecting the first ultra-fine particles coated with the second ultra-fine particles.

7. The apparatus as claimed in claim 6, wherein the at least one nozzle is entirely accommodated in the passage of the duct.

8. An apparatus for manufacturing ultra-fine particles using corona discharge, comprising:
    means for supplying a first reaction gas;
    at least one first nozzle connected to the means for supplying a first reaction gas, configured for injecting the first reaction gas flowing therein, and configured for producing a number of first ultra-fine particles by corona discharge of injected first reaction gas;
    means for applying a first high voltage to the at least one first nozzle and configured for causing corona discharge at the at least one first nozzle;
    a first duct enclosing the at least one first nozzle and configured for forming a passage between the at least one first nozzle and the first duct;
    means for supplying the passage of the first duct with a second reaction gas different from the first reaction gas;
    at least one second nozzle installed at a distal end of the first duct, configured for injecting the first ultra-fine particles and the second reaction gas flowing therein, configured for producing a number of second ultra-fine particles by corona discharge of injected second reaction gas, and configured for coating the first ultra-fine particles with the second ultra-fine particles;
    means for applying a second high voltage to the at least one second nozzle and configured for causing corona discharge at the at least one second nozzle; and
    means for collecting spaced from the at least one second nozzle and configured for collecting the first ultra-fine particles coated with the second ultra-fine particles.

9. The apparatus as claimed in claim 8, further comprising a second duct enclosing the first duct and the at least one second nozzle configured for forming a passage between the first duct and the second duct and between the at least one second nozzle and the second duct, and means for supplying sheath gas to the passage of the second duct configured for forming a gas curtain that leads flow of the first ultra-fine particles coated with the second ultra-fine particles between the at least one second nozzle and the means for collecting.

10. The apparatus as claimed in claim 9, further comprising a first variable resistor configured for dropping the first high voltage applied from the means for applying a first high voltage to a first low voltage and configured for applying a first low voltage to the first duct, a second variable resistor connected to the first variable resistor and grounded, a third variable resistor configured for dropping the second high voltage applied from the means for applying a second high voltage to a second low voltage and configured for applying a second low voltage to the second duct, and a fourth variable resistor connected to the third variable resistor and grounded.

11. The apparatus as claimed in claim 9, wherein a tip of the at least one second nozzle extrudes out the second duct, the apparatus further comprising a means for delivering the means for collecting.

12. A method for manufacturing ultra-fine particles using corona discharge, comprising steps of:

generating corona discharge by applying a voltage to a nozzle;

supplying reaction gas to the nozzle;

producing a number of ultra-fine particles by injecting the reaction gas into a corona discharge region of the nozzle; and collecting the ultra-fine particles, the ultra-fine particles passing through the corona discharge region of the nozzle.

13. The method as claimed in claim 12, wherein the voltage is applied in the form of a pulse.

14. The method as claimed in claim 12, further comprising the step of forming a gas curtain of sheath gas in order to lead flow of the ultra-fine particles between the nozzle and the location of collecting.

15. The method as claimed in claim 12, further comprising the steps of supplying a second reaction gas different from the reaction gas to the surroundings of the ultra-fine particles flowing from the nozzle to the location of collecting, producing a number of second ultrafine particles by allowing the second reaction gas to react thermochemically by providing the second reaction gas with heat energy, and coating the ultra-fine particles with the second ultra-fine particles.

16. A method for manufacturing ultra-fine particles using corona discharge, comprising steps of:

generating corona discharge by applying a first voltage to a first nozzle;

generating corona discharge by applying a second voltage to a second nozzle positioned downstream of the first nozzle;

injecting a first reaction gas into a corona discharge region of the first nozzle;

producing a number of first ultra-fine particles by injecting the first reaction gas into a corona discharge region of the first nozzle;

mixing the first ultra-fine particles and second reaction gas and supplying them to the second nozzle;

injecting a mixed gas of the ultra-fine particles and the second reaction gas into a corona discharge region of the second nozzle and coating the first ultra-fine particles with a number of second ultra-fine particles produced from the second reaction gas; and collecting the first ultra-fine particles coated with the second ultra-fine particles.

17. The method as claimed in claim 16, further comprising the step of forming a gas curtain of sheath gas in order to lead flow of the ultra-fine particles between the second nozzle and the location of collecting.

18. The method as claimed in claim 16, wherein the first and second voltages are applied in the form of a pulse.

* * * * *